United States Patent [19]

Owen

[11] 4,054,389

[45] Oct. 18, 1977

[54] SPECTROPHOTOMETER WITH PHOTODIODE ARRAY

[75] Inventor: Theodore R. Owen, Wappingers Falls, N.Y.

[73] Assignee: International Business Machines Corporation, Armonk, N.Y.

[21] Appl. No.: 724,795

[22] Filed: Sept. 23, 1976

[51] Int. Cl.² .................................. G01J 3/50
[52] U.S. Cl. .................... 356/189; 350/166; 356/100
[58] Field of Search ............... 356/99, 100, 186, 189; 250/226, 227; 350/166, 96 B, 311, 318

[56] References Cited

U.S. PATENT DOCUMENTS 3,869,212 3/1975 Burcher .................. 356/189
3,929,398 12/1975 Bates .................... 356/186

Primary Examiner—F. L. Evans
Attorney, Agent, or Firm—Edward S. Gershuny

[57] ABSTRACT

In a spectrophotometer, light that has passed through, or been reflected from, a sample is carried by a fiberoptic bundle. The output end of the fiberoptic bundle is bonded to one side of a wedge-shaped linear variable interference filter. The other side of the filter is bonded to an array of photodiodes. Because each photodiode receives light that has passed through a different portion of the filter, each photodiode will respond to light of a different wavelength.

2 Claims, 2 Drawing Figures

SPECTROPHOTOMETER WITH PHOTODIODE ARRAY

BACKGROUND OF THE INVENTION

This invention relates to spectrophotometers, and more particularly to means for separating light into different wavelengths and for detecting and measuring the amount of light in each of the different wavelengths.

All spectrophotometers include a light source, means for separating light from the source into different wavelengths, and means for sensing and measuring the amount of light in the different wavelengths. As shown, for example, in U.S. Pat. No. 3,885,879 one means for separating the light into different wavelengths utilizes a spectral wedge interference filter which can be moved relative to a fiberoptic bundle. The filter is placed between the light source and the fiberoptic bundle and, as the filter is moved laterally, it passes light of different wavelengths.

BRIEF DESCRIPTION OF THE INVENTION

In accordance with a preferred embodiment of this invention, a fiberoptic bundle is bonded to one side of a spectral wedge interference filter, to the other side of which is bonded a linear array of photodiodes. Light which has passed through, or been reflected from, a sample is carried by the fiberoptic bundle to the first side of the filter. Various portions of the filter pass different wavelengths of this light to the array of photodiodes on the other side of the filter. Each of the photodiodes produces an output signal that is proportional to the amount of light falling upon it. By measuring the outputs of the various photodiodes, the amount of light in each of the various wavelengths can be determined.

This means for breaking the light down into various specific wavelengths contains no moving parts. Once the assembly has been bonded together, its components will not get out of registration with respect to other components, and each of the photodiodes will always react to a particular known wavelength of light. This makes the invention ideal for use as a portable spectrometer because the effects of moving it will not damage its accuracy.

Another advantage of this invention is that there is no way for dust or contaminants to interfere with the light sensing capability of the photodiodes.

Also, this means of separating the light into different wavelengths will be less expensive and much smaller in size than means typically used in the prior art.

Additional, this device will take measurements across a broad spectrum of wavelengths very rapidly because there is no mechanical motion.

The foregoing and other features and advantages of the invention will be apparent from the following more particular description of a preferred embodiment thereof as illustrated in the accompanying drawings.

DETAILED DESCRIPTION

Figure 1:
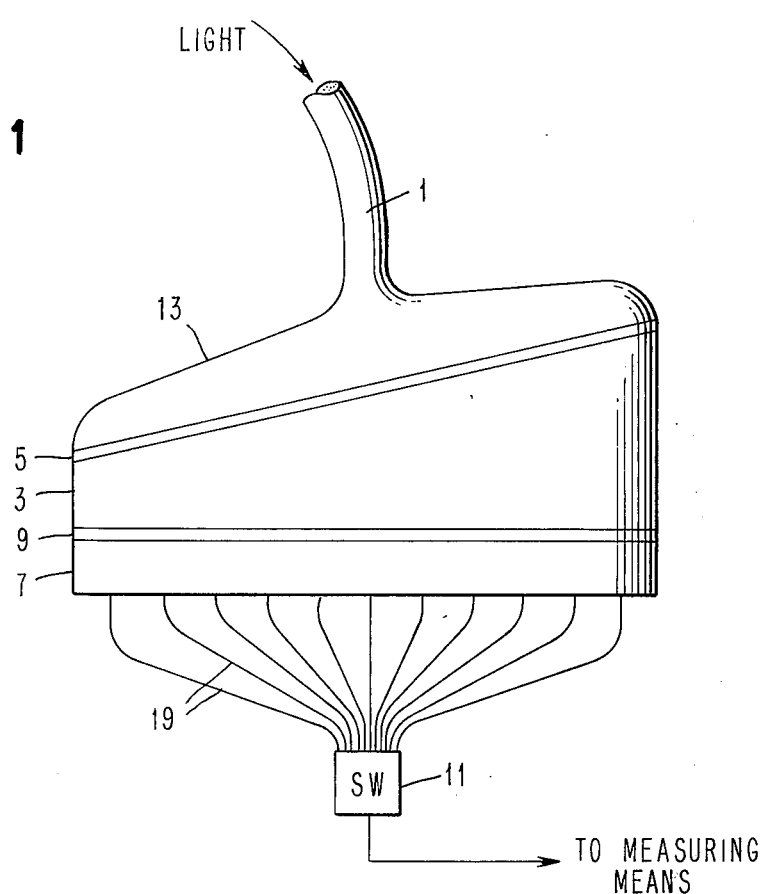
FIG. 1 shows the means for separating light into different wavelengths and for detecting each of the wavelengths.

As shown in FIG. 1, in a preferred embodiment of the invention light from a sample is carried by a fiberoptic bundle 1. The output end of the fiberoptic bundle is bonded to a spectral wedge 3 by a thin layer of bonding material 5. The fiberoptic strands within the bundle 1 are distributed across the top surface of the wedge 3.

At the other surface of the wedge a linear array 7 of photodiodes is bonded to the wedge 3 by a layer of bonding material 9. In the preferred embodiment of the invention, the linear array 7 contains 512 photodiodes with the centers about one mil apart. (Most applications of this invention will not actually require the use of 512 photodiodes. For example, for simple color analysis, sixteen diodes, covering sixteen intervals from 400 to 700 nanometers, will suffice. For most applications, 128 diodes covering 128 intervals will be sufficient. However, for maximum flexibility and precision, 512 diodes are preferred.) Such an array can be purchased, for example, for Reticon Corporation. The output of each of the photodiodes in the linear array 7 is connected to a switch 11 which is utilized to connect the photodiodes to a means (not shown) for measuring the photodiode output.

Figure 2:
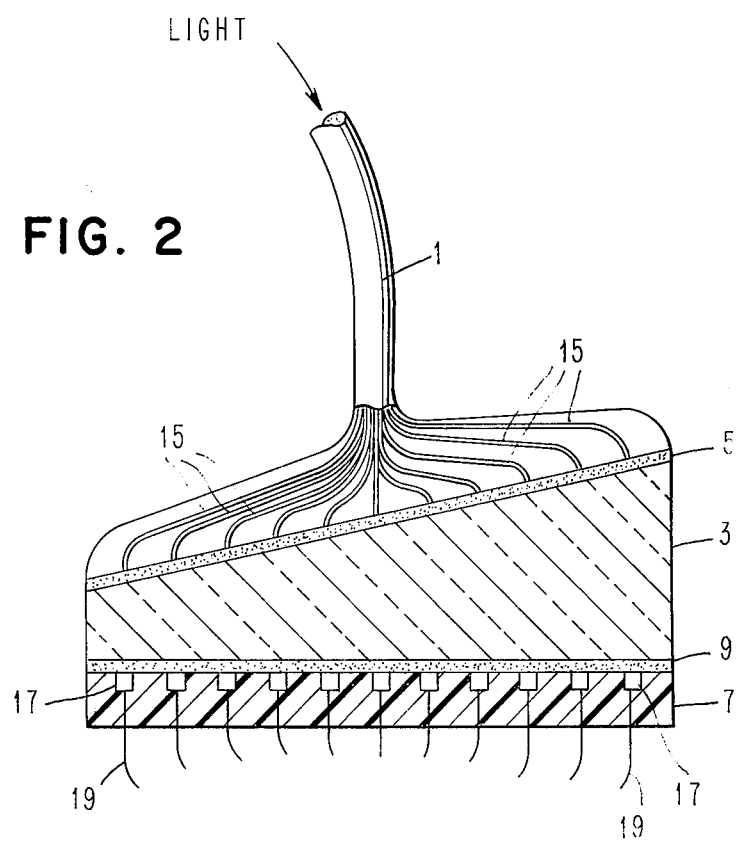
FIG. 2 is a cross-sectional view along the lines 2-2 of the invention illustrated in FIG. 1.

As is shown more clearly in the cross-sectional view of FIG. 2, at the output of fiberoptic bundle 1 the strands 15 in the bundle are distributed uniformly across the upper surface of the wedge 3. In the preferred embodiment of this invention, the spectrum of light that will be passed by wedge 3 extends from approximately 400 nanometers to approximately 700 nanometers, all in the visual range. Associated with the distributed fiberoptic strands 15 are a number of photodiodes 17 arranged in a linear array 7. Each of the photodiodes 17 receives light that is transmitted through a small portion of the wedge 3 and produces a signal on line 19. All of the lines 19 are connected to a switch (11, FIG. 1) which may be used to select a signal on any one of lines 19 for transmission to a means for measuring same.

After the invention is built, and before its first use, it should be calibrated. Calibration is most simply accomplished by introducing monochromatic light, of known wavelengths, into the fiberoptic bundle 1 and measuring the response of the photodiodes to each of the calibration wavelengths. Those skilled in the art will readily appreciate that a series of such measurements will produce the data necessary to generate appropriate calibration charts and determine the wavelength to which each diode responds. Because the invention is preferably built as a sealed unit, this calibration need only be performed at relatively infrequent intervals. (The calibration should be rechecked periodically because it could possibly be affected by certain conditions such as aging of the components of the invention, most particularly, aging of the wedge 3.) One advantage of performing this initial calibration is that it enables the use of almost any reasonably transparent bonding material for the materials 5 and 9 which bond the fiberoptic strands and the diode array, respectively, to the wedge. If the layers 5 and 9 were to affect light passing through them, the effects would be automatically corrected by the initial calibration.

In addition to the wavelength calibration described above (which will normally be done at infrequent intervals) the spectrophotometer should be frequently calibrated with respect to a known reference in the same manner commonly used in the prior art. To calibrate the apparatus for transmission density measurement, distilled water may be used as a reference. To calibrate the apparatus for reflection density measurements, reference materials such as, for example, magnesium oxide or barium sulphate may be used.

Although the preferred embodiment described herein is a single beam spectrophotometer, those skilled in the art will recognize that the invention is also applicable to a dual beam spectrophotometer. In a dual beam system, two sets of distributed fibers would be utilized. One set would carry light from a reference, and the other set would carry light from a sample being tested. The two sets of fibers could be distributed above one set of diodes, or two separate sets of diodes could be utilized. Primarily because it is easier to manufacture, the single beam embodiment of this invention will generally be preferred.

In the preferred embodiment of the invention described above, the fiberoptic strands are uniformly distributed across one face of the wedge. Those skilled in the art will recognize that such an arrangement will result in relatively lower diode outputs at the shorter wavelength end of the light spectrum than at the longer wavelength end. If a uniform (flat) diode response across the entire spectrum is desired, the fibers can be distributed across the face of the wedge so as to produce a higher density of fibers at the shorter wavelength end than at the longer wavelength end. Those skilled in the art will recognize that the particular density distribution of fiberoptic strands will depend upon the nature of the light source utilized.

In the preferred embodiment described above, the fiberoptic bundle 1 and the fiberoptic strands 15 serve the function of carrying light to the wedge 3, through which the light passes to the individual photodiodes 19 in the array 7. However, light could be directed from the sample under test to the wedge in other known ways. For example, the "upper" surface of the wedge could be fixed to a dome which holds the sample, so that the wedge covers a window through which light that has been reflected from, or has passed through, the sample will pass.

While the invention has been particularly shown and described with reference to a preferred embodiment thereof, it will be understood by those skilled in the art that the above and other changes in form and details may be made therein without departing from the spirit and scope of the invention.

What is claimed is:

1. For use in a spectrophotometer for analyzing the spectra associated with a beam of light across a wide wave band, the combination of:
   a linear variable interference filter covering at least the spectrum of light to be analyzed;
   transmission means, comprising a fiberoptic bundle for carrying said beam of light, for causing said beam of light to impinge upon one side of said interference filter;
   the output end of said fiberoptic bundle comprising a plurality of fiberoptic strands distributed in a substantially linear manner across said one side of said interference filter, said strands being fixed to said interference filter;
   a linear array of photodiodes bonded to the other side of said interference filter for receiving light transmitted through said interference filter, said photodiodes each being operative to produce an electrical signal proportional to the intensity of light received by it; and
   means for selectively connecting said photodiodes to apparatus for measuring said electrical signal.

2. For use in a spectrophotometer for analyzing the spectra associated with a beam of light across a wide wave band, the combination of:
   a linear variable interference filter covering at least the spectrum of light to be analyzed;
   transmission means, comprising a fiberoptic bundle for carrying said beam of light, for causing said beam of light to impinge upon one side of said interference filter;
   the output end of said fiberoptic bundle comprising a plurality of fiberoptic strands distributed across said one side of said interference filter, the distribution density of said strands varying from a maximum at the end of said interference filter which passes relatively short wavelengths to a minimum at the end of said interference filter which passes relatively long wavelengths, said strands being fixed to said interference filter;
   a linear array of photodiodes bonded to the other side of said interference filter for receiving light transmitted through said interference filter, said photodiodes each being operative to produce an electrical signal proportional to the intensity of light received by it; and
   means for selectively connecting said photodiodes to apparatus for measuring said electrical signal.

* * * * *